United States Patent [19]
Heide et al.

[11] Patent Number: 6,029,426
[45] Date of Patent: Feb. 29, 2000

[54] DETECTION OF TRANSVERSAL AND LONGITUDINAL SEALS OF A PACKAGE COMPOSED OF A LAMINATED MATERIAL

[75] Inventors: Benny Heide, Campinas, Brazil; B. A. Arnspong, Northbrook, Ill.

[73] Assignee: Tetra Laval Holdings & Finance, SA, Pully, Switzerland

[21] Appl. No.: 09/115,303

[22] Filed: Jul. 14, 1998

[51] Int. Cl.[7] ........................................ B65B 9/10
[52] U.S. Cl. ........................ 53/451; 53/53; 53/75
[58] Field of Search ..................... 53/451, 53, 75, 53/396, 384.1, 507; 73/864.51, 865.8; 493/37, 309

[56] References Cited

U.S. PATENT DOCUMENTS

| | | |
|---|---|---|
| 4,647,332 | 3/1987 | Rager . |
| 4,802,323 | 2/1989 | Garris et al. ................................ 53/53 |
| 4,813,205 | 3/1989 | Mikata et al. .............................. 53/53 |
| 4,955,176 | 9/1990 | Seko et al. . |
| 4,964,258 | 10/1990 | Seko et al. . |
| 5,096,813 | 3/1992 | Krumhar et al. . |
| 5,551,206 | 9/1996 | Fukuda . |
| 5,727,684 | 3/1998 | Webb et al. . |
| 5,755,081 | 5/1998 | Rivett et al. . |

*Primary Examiner*—John Sipos
*Attorney, Agent, or Firm*—Welsh & Katz, Ltd.

[57] ABSTRACT

A method and means of detecting the seals of a package is disclosed herein. The invention includes coloring the inner coating of a laminated material that is used to create a package on a form, fill and seal packaging machine. The invention also discloses coloring the longitudinal strip of the package. The coloring of the inner coating allows an operator to distinguish between an acceptable seal and a defective seal since a delamination, which is acceptable, may appear to be a defective seal without the inner coating coloring. The colored longitudinal strip also allows one to distinguish between a defective longitudinal seal and a delamination of the longitudinal strip.

5 Claims, 9 Drawing Sheets

DETECTION OF TRANSVERSAL AND LONGITUDINAL SEALS OF A PACKAGE COMPOSED OF A LAMINATED MATERIAL

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to the detection of adequate transversal and longitudinal seals for packaging composed of a laminated material. Specifically, the present invention relates to a method to determine if the transversal and longitudinal seals of a parallelepiped container fabricated on a vertical form, fill and seal packaging machine, and a material therefor.

2. Description of the Related Art

During fabrication of the ubiquitous TETRA BRIK® package or imitators thereof, on a vertical form fill and seal machine, transversal and longitudinal seals are made to a web of material to create the general form of the package. Further folding and sealing of the flaps creates the distinctive TETRA BRIK® package. The package is usually composed of a paperboard base layer with a barrier layer such as aluminum and coatings of a thermoplastic such as polyethylene. During production, it is recommended that the operator verify the seals of at least one package every predetermined time period. For example, if the production time is six hours, the operator should verify the seals every thirty minutes.

The operator verifies the seal by tearing open the package at its seal, essentially attempting to "unseal" the package. Thus, to verify a transversal seal, the operator grasps each side of the package and exerts an outward force to tear open the package. If the transversal seal is adequate, delamination will occur, the paperboard layer will rupture, or the aluminum layer will come off of one side of the sealing area. However, if the seal is inadequate the two sides will separate without rupturing. The operator is sometimes unable to distinguish between a delaminated sealing area and one in which the two sides have separated without rupturing. When this occurs, the entire production will be mistakenly destroyed by the operator under the belief that the transversal seal is inadequate, thereby possibly rendering the product defective. It is obvious that such a mistake may increase the costs of production.

A similar verification of the longitudinal seal is also performed at set intervals during a production cycle. However the longitudinal seal involves a strip that is sealed to the web of packaging material to create a tube about the fill pipe of the packaging machine. An operator determines if the strip is adequate by tearing the strip from the package. The seal is defective if the strip is removed without affecting the thermoplastic coatings. However, the longitudinal strip is also a laminated material and confusion between delamination and unaffected coatings may lead the mistaken belief that the seal is inadequate.

Thus, there remains a need to clearly determine if the transversal and longitudinal seals are acceptable or defective.

BRIEF SUMMARY OF THE INVENTION

The primary object of the present invention is provide a method of distinguishing between a defective seal and an acceptable seal in a parallelepiped packaged fabricated from a web of material on a vertical form, fill and seal packaging machine.

An additional object of the present invention is to provide a package having a coloured inner coating layer to distinguish between a delamination of the layers of the package and a defective seal.

An additional object of the present invention to provide a multiple coloured longitudinal strip to distinguish between a delamination of the layers of the longitudinal strip and a defective longitudinal seal.

Having briefly described this invention, the above and further objects, features and advantages thereof will be recognized by those skilled in the pertinent art from the following detailed description of the invention when taken in conjunction with the accompanying drawings.

BRIEF DESCRIPTION OF SEVERAL VIEWS OF THE DRAWINGS

There is illustrated in FIG. 1 a perspective view of a final filled, sealed and completely folded package.

There is illustrated in FIG. 1A a bottom perspective of the package of FIG. 1.

Figure 1:
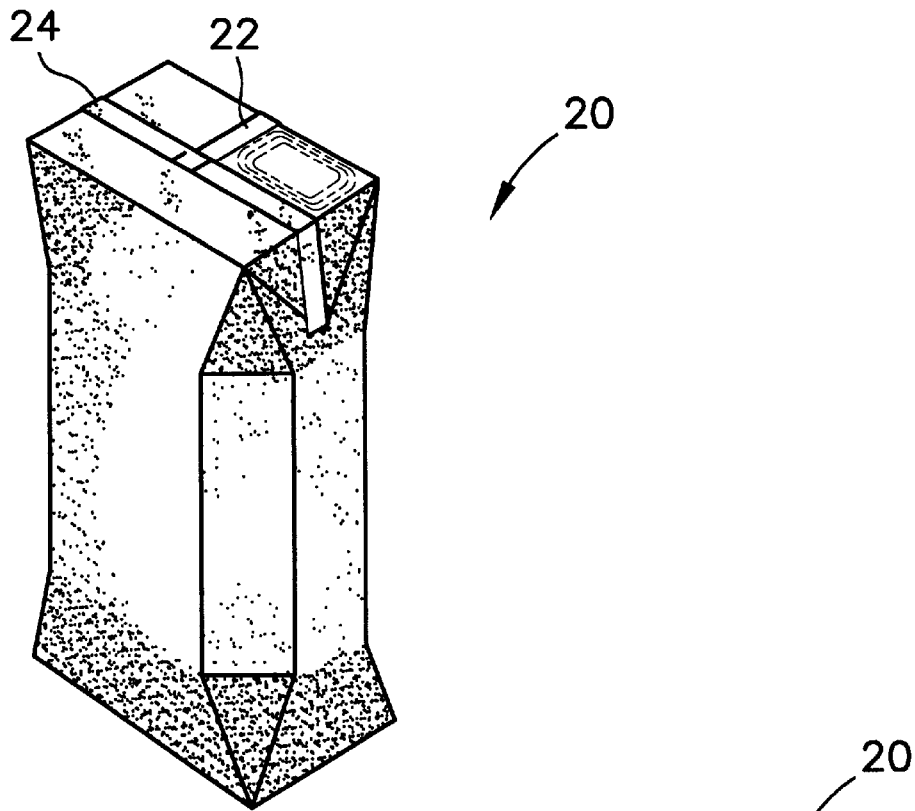
Figure 2:
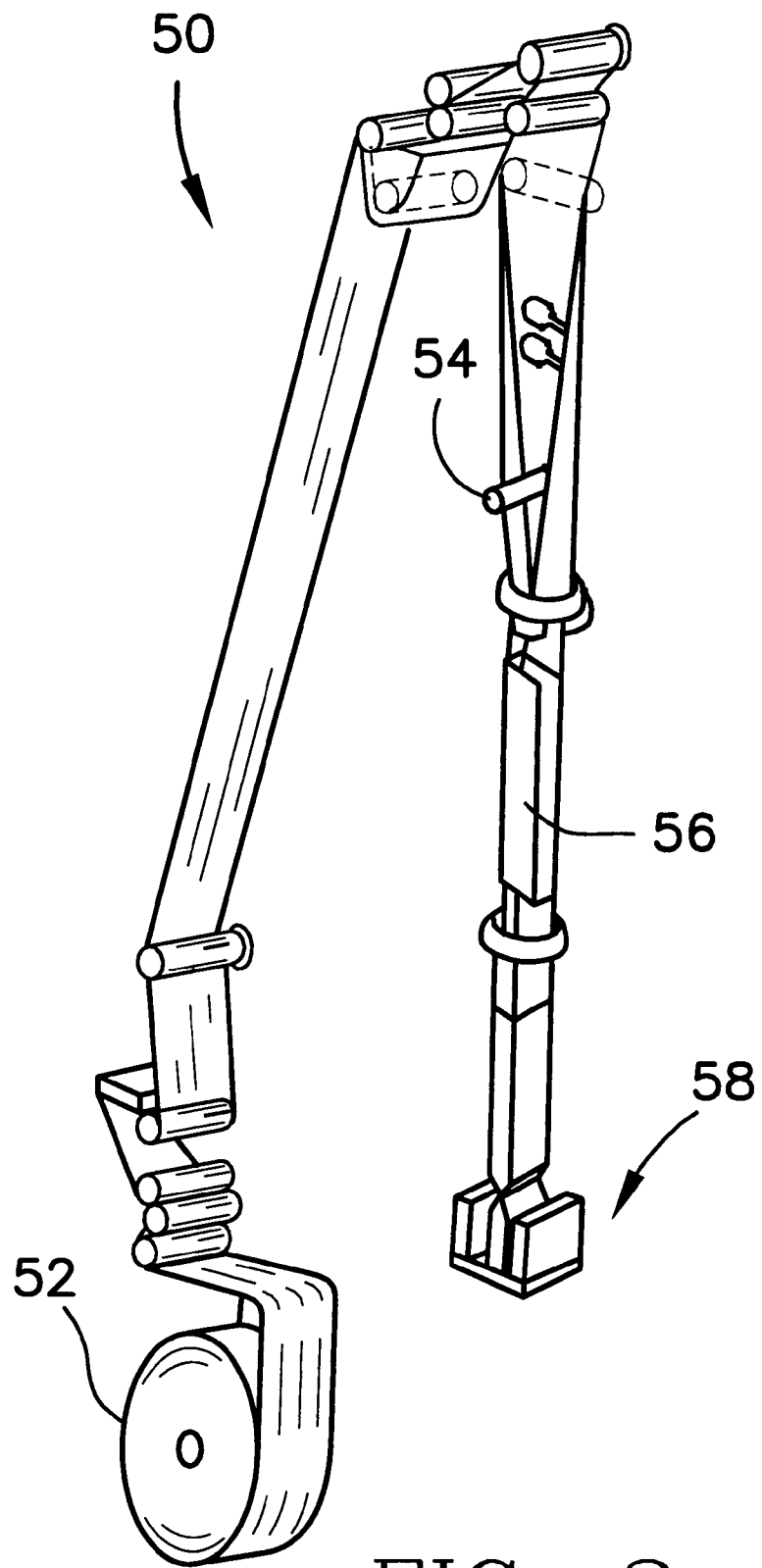

There is illustrated in FIG. 2 a schematic view of a vertical form, fill and seal packaging machine for fabricating the package of FIG. 1.

Figures 3, 3A:
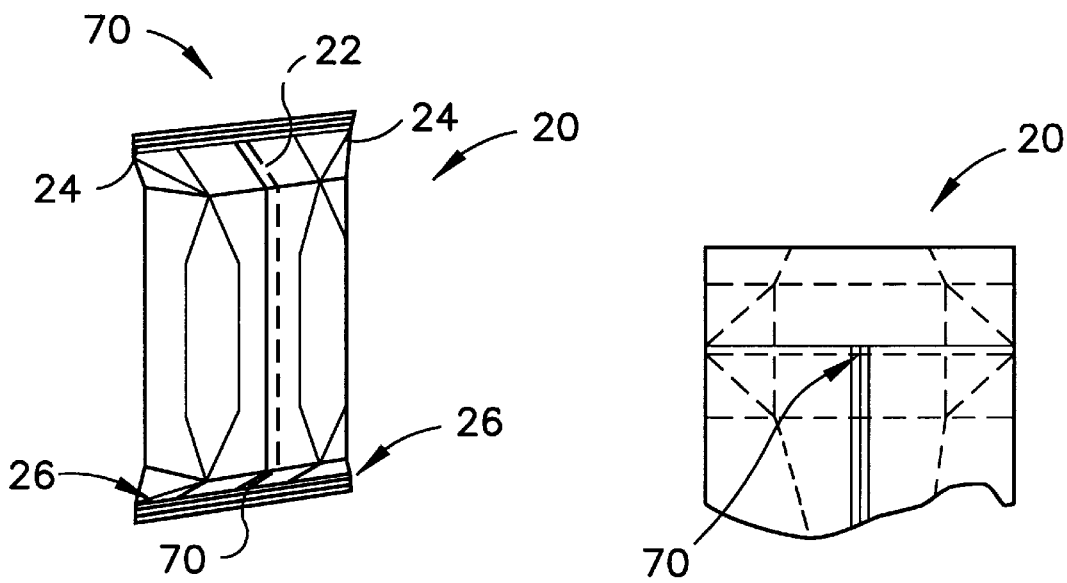

There is illustrated in FIG. 3 a perspective view of the package after transversal sealing, however, prior to final folding.

There is illustrated in FIG. 3A a plan view of both sides of the package at the critical junction of the longitudinal seal and one of the transversal seals of the package.

Figure 4:
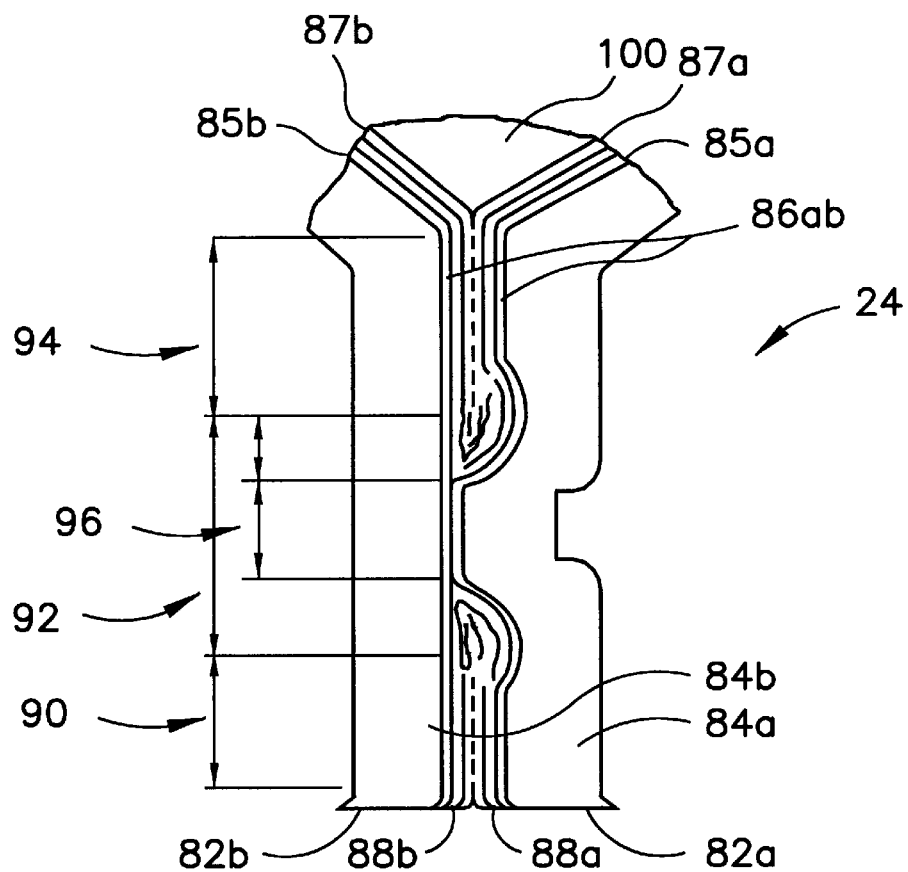

There is illustrated in FIG. 4 a cross-sectional view of a transversal seal of the package.

Figure 5:
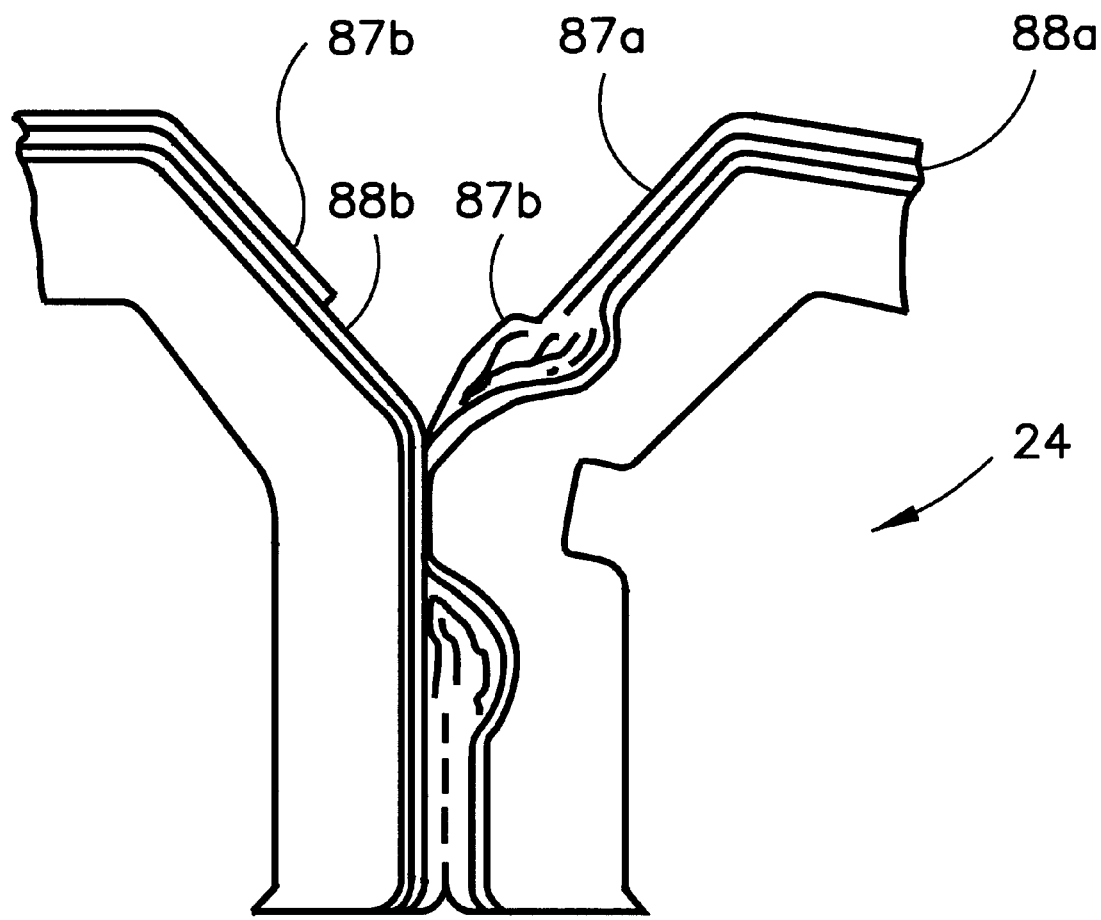

There is illustrated in FIG. 5 a cross-sectional view of a transversal seal of the package wherein the seal has been pulled apart and delamination has occurred between the inner layers.

Figure 6:
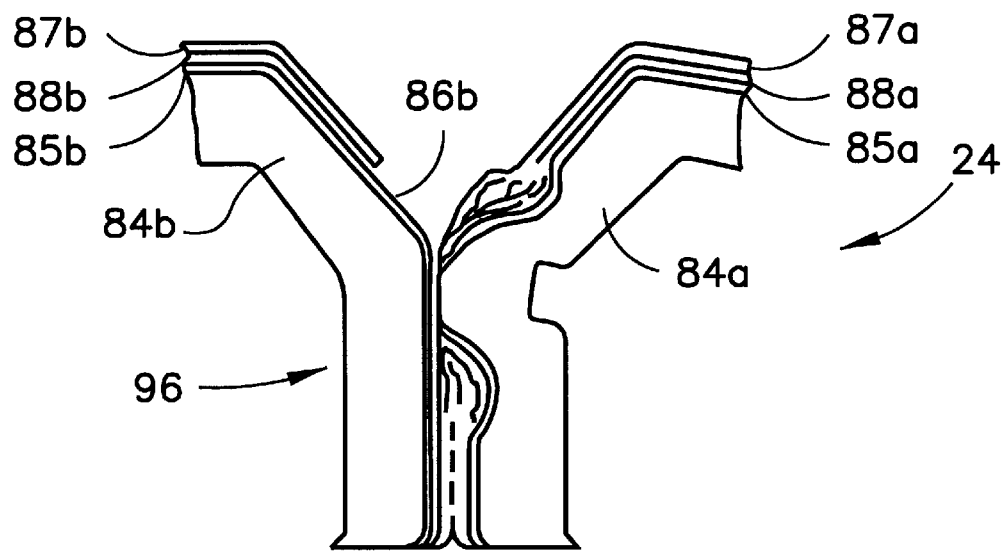

There is illustrated in FIG. 6 a cross-sectional view of a transversal seal of the package wherein the seal has been pulled apart and the barrier layer is visible on one side.

Figure 7:
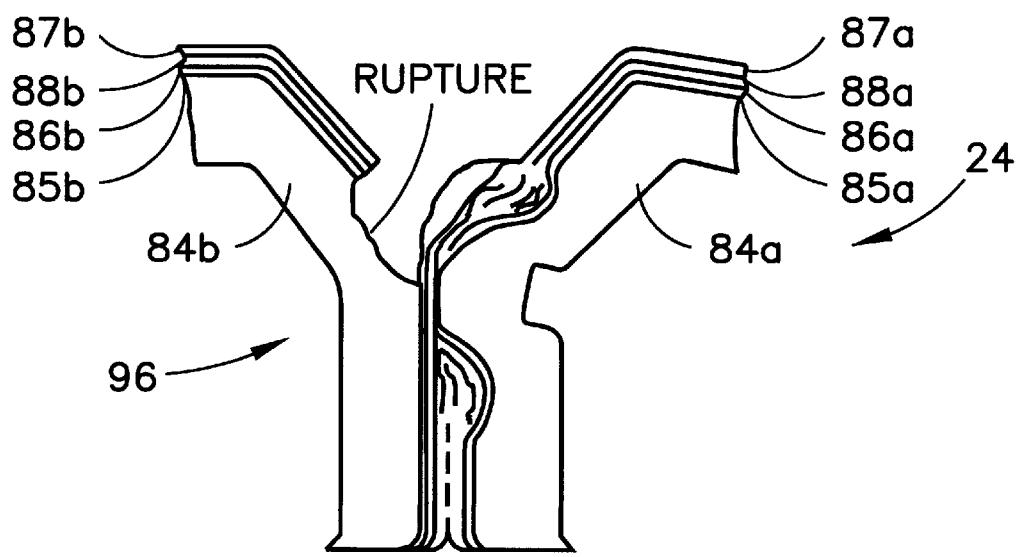

There is illustrated in FIG. 7 a cross-sectional view of a transversal seal of the package wherein the seal remains intact, however, a rupture takes place in the paperboard layer.

Figure 8:
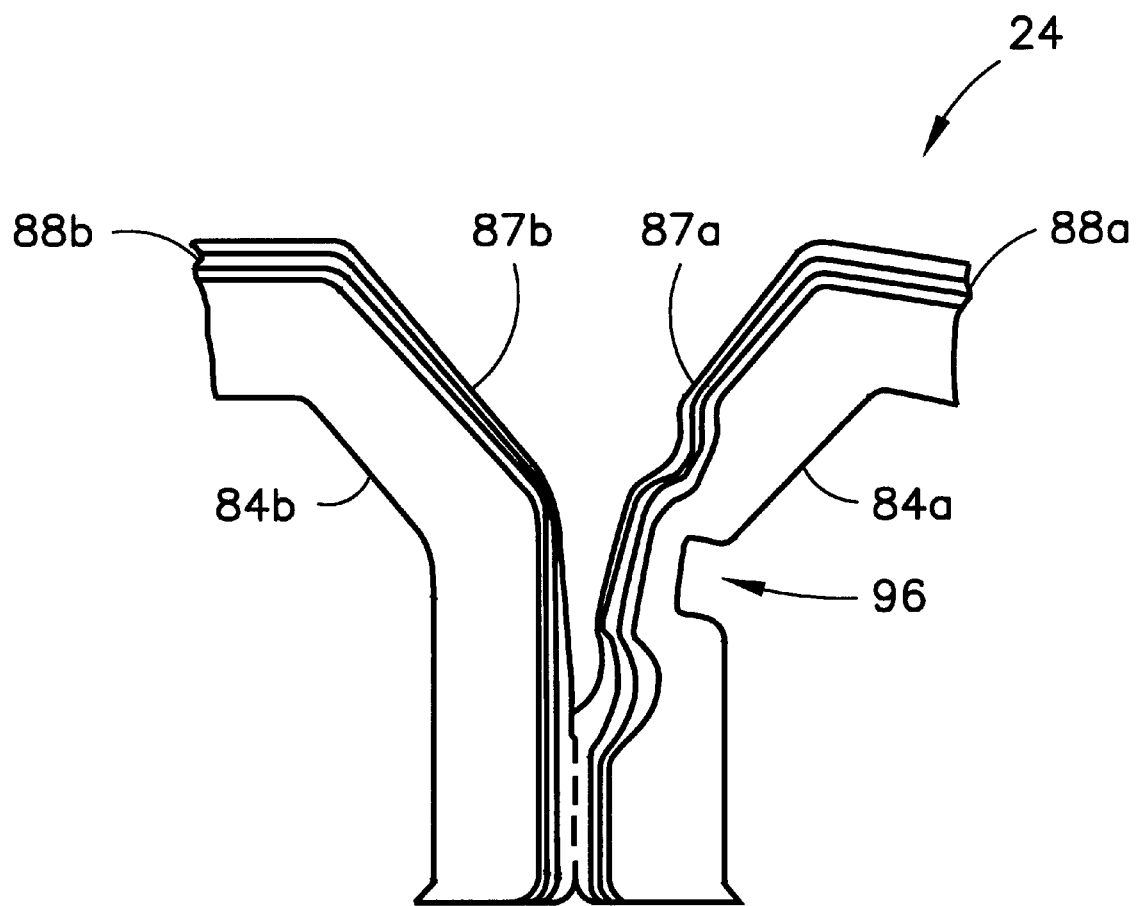

There is illustrated in FIG. 8 a cross-sectional view of a transversal seal of the package wherein the seal is defective and the two plastic layers separate without rupturing.

Figure 9:
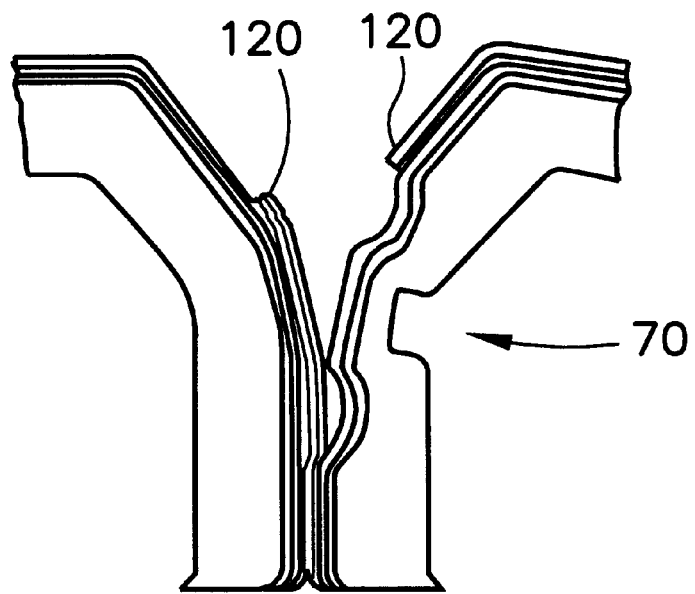

There is illustrated in FIG. 9 a cross-sectional view of the critical junction between a transversal seal and the longitudinal seal of the package wherein the seal has been pulled apart and a rupture occurs, indicative of an acceptable seal.

Figure 10:
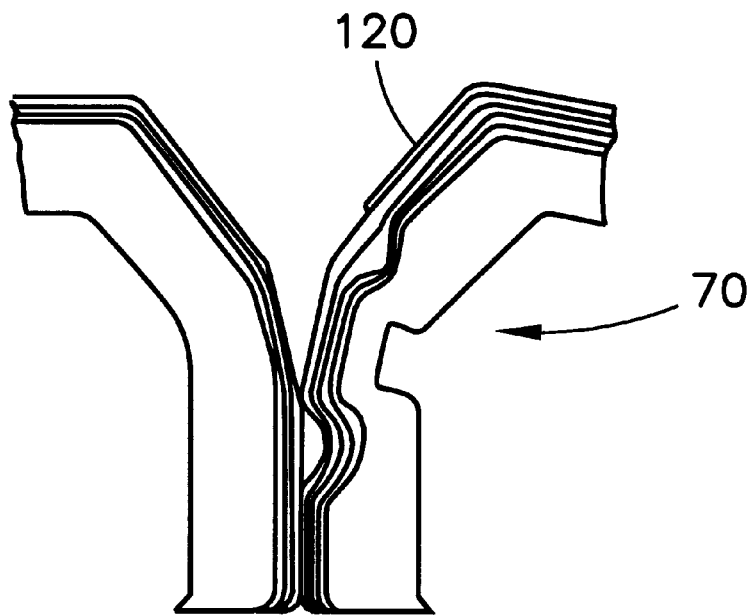

There is illustrated in FIG. 10 a cross-sectional view of the critical junction between a transversal seal and the longitudinal seal of the package wherein the seal has been pulled apart and no rupture occurs, indicative of a defective seal.

Figure 11:
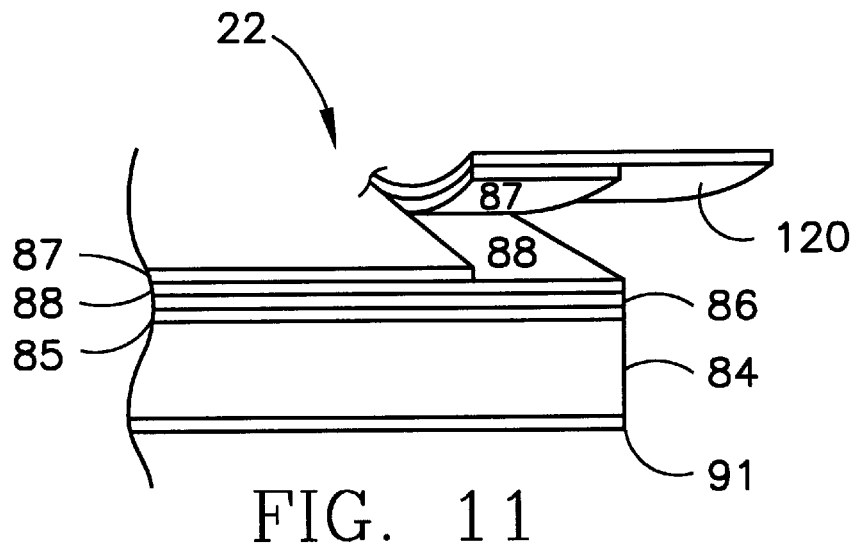

There is illustrated in FIG. 11 a cross-sectional view of the longitudinal seal of the package wherein the longitudinal seal is pulled apart and one of the inner layers is attached to the longitudinal seal.

Figure 12:
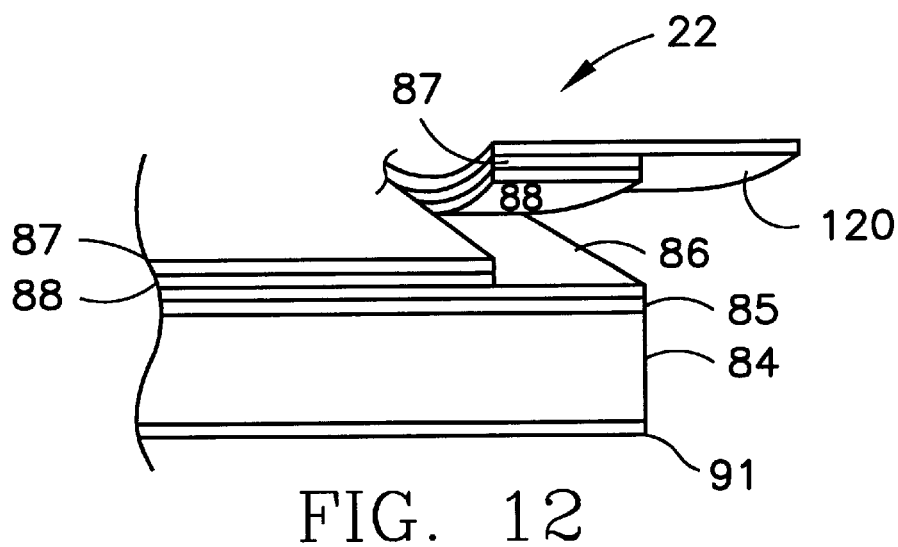

There is illustrated in FIG. 12 a cross-sectional view of the longitudinal seal of the package wherein the longitudinal strip is pulled apart and both inner layers are removed with the longitudinal strip revealing the barrier layer.

Figure 13:
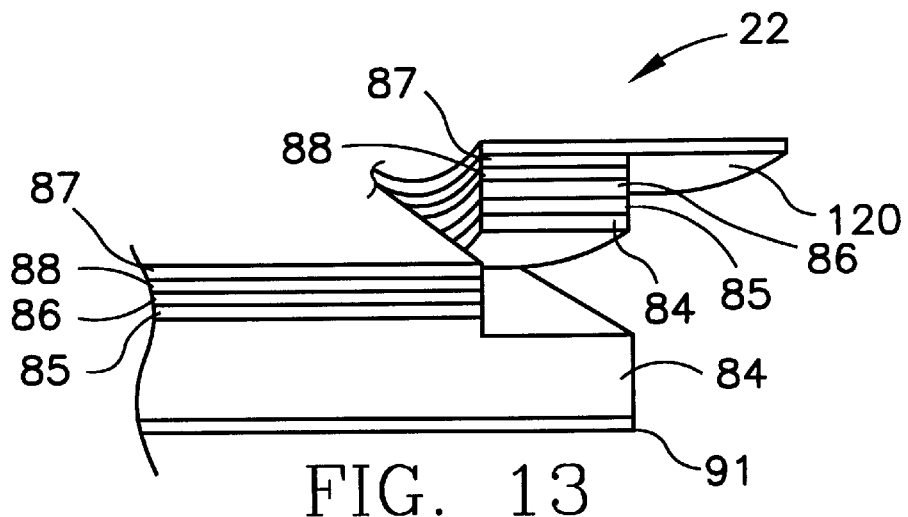

There is illustrated in FIG. 13 a cross-sectional view of the longitudinal seal of the package wherein the longitudinal strip is pulled apart and all the layers are removed with the longitudinal strip revealing the paperboard.

Figure 14:
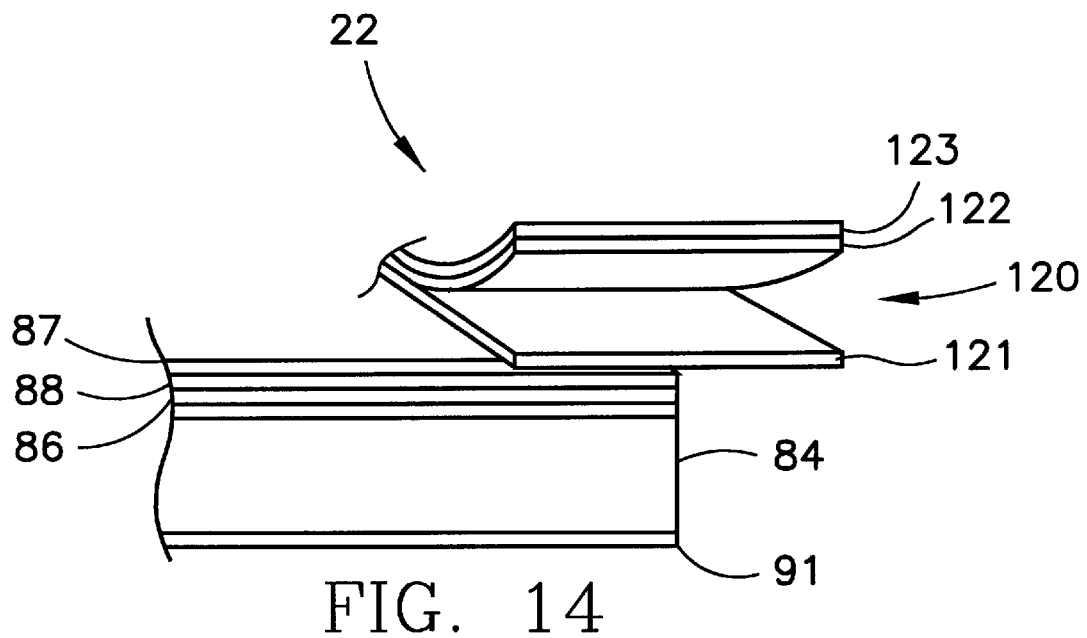

There is illustrated in FIG. 14 a cross-sectional view of the longitudinal seal of the package wherein the longitudinal strip is pulled apart and the strip delaminates.

Figure 15:
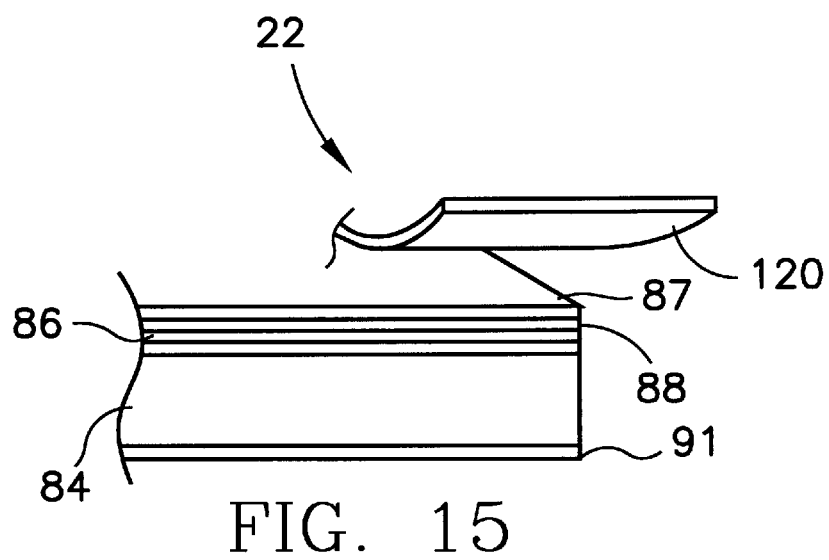

There is illustrated in FIG. 15 a cross-sectional view of the longitudinal seal of the package wherein the longitudinal strip is pulled apart and the inner layer is revealed, indicative of a defective seal.

DETAILED DESCRIPTION OF THE INVENTION

Figure 1A:
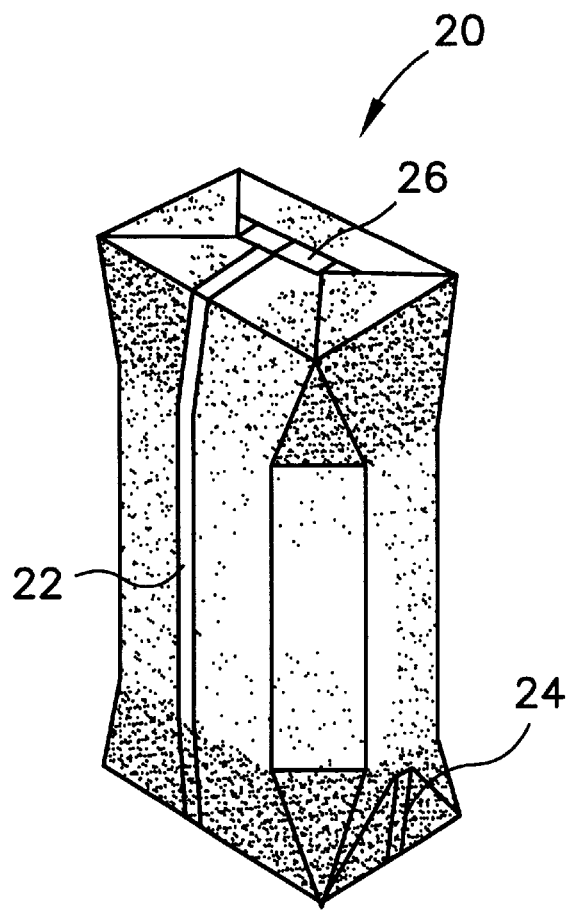

As shown in FIGS. 1 and 1A, one example of a parallelepiped package 20 has a longitudinal seal 22, a first transversal seal 24 and a second transversal seal 26. The package 20 may be fabricated on a vertical form, fill and seal packaging machine 50 as shown in FIG. 2. The machine 50 receives a web of packaging material 52 that is driven through several rollers and folded into a tube about a fill pipe 54. The material tube is then sealed at a longitudinal sealer 56 that creates the longitudinal seal 22 on the package 20. After the longitudinal sealer 56 is the transversal sealer 58. In operation, the transversal sealer 58 seals the top of one package while simultaneously sealing the bottom of the next package. When the bottom transversal seal is made, the package is filled with a product, then the top transversal seal is made to complete the package. The top transversal seal also cuts the package from the remaining tube of material. The package is then folded and shaped into the final package 20. FIGS. 3 and 3A illustrate the package before final folding and shaping. Also shown in FIGS. 3 and 3A are the critical junctions 70 between the longitudinal seal 22 and the transversal seals 24 and 26.

FIG. 4 is a cross-sectional view of the transversal seal. Both sides 82a–b have the same structure and are sealed to one another. The structure includes a paperboard layer 84a–b, a first thermoplastic layer 85a–b, a barrier layer 86a–b, and a second and third thermoplastic double layers 87a–b and 88a–b. Upon sealing, the two thermoplastic layers 87a and 87b should melt to each other forming a strong chemical bond between the sides 82a–b. The present invention has at least the second thermoplastic layer 87a–b coloured to allow one to distinguish it from the other layers of the package, specifically the third thermoplastic layer 88a–b. Alternatively, the third thermoplastic layer 88a–b may be coloured to distinguish it from the second thermoplastic layer 87a–b and the barrier layer 86a–b if the barrier layer composed of a transparent polymer instead of aluminum.

The transversal seal 24 or 26, may be further partitioned into various regions. A first blocked area 90 is adjacent a sealed area 92 which is adjacent a second blocked area 94 which is adjacent the product 100. The sealed area 92 has a ridge area 96.

FIGS. 5–8 illustrate the transversal seal area 22, after being pulled apart to determine if the seal is acceptable or defective. In FIG. 5, the seal is acceptable since the seal remains intact, however, a delamination occurs wherein the second thermoplastic layer 87b delaminates from the third thermoplastic layer 88b which indicates that the seal is acceptable. In FIG. 6, the seal is acceptable since the seal remains intact, however, the barrier layer 86b is removed on one side presenting a shiny metal surface if the barrier layer 86b is composed of aluminum. In FIG. 7, the seal is acceptable since the seal remains intact, however, the paperboard layer 84b is ruptured which is indicative of a good seal.

In FIG. 8, the seal is defective since the two inner thermoplastic layers 87a and 87b separate without rupturing, delaminating, or in any other way adhere to each other. As is apparent to those skilled in the art, it is difficult to distinguish between the defective seal of FIG. 8 and the acceptable seal of FIG. 5.

The present invention allows one skilled in the art to distinguish between the defective seal of FIG. 8 and the acceptable seal of FIG. 5. In FIG. 5, when the present invention is practiced only one side 82a will have a colour coating while the other side 82b will be clear. Alternatively, if the third thermoplastic layer 88a–b is a different colour than the second thermoplastic layer 87a–b, then each side 82a–b will have a different colour. For example, if the second thermoplastic layer 87a–b is yellow and the third thermoplastic layer 88a–b is blue, if a delamination occurs as shown in FIG. 5, then side 82a will have a yellow "face" and side 82b will have a blue "face" allowing one to unquestionably determine that the seal was acceptable.

If the seal is defective as shown in FIG. 8, both sides 82a–b will have a coloured "face" if the second thermoplastic layer 87a–b is coloured. For example, if the second thermoplastic layer 87a–b is yellow, when the seal 24 is pulled apart both sides will have a yellow "face" allowing one to determine without doubt that the seal 24 was defective and to take corrective action on the machine 50. The colour coating of the layers 87a–b and 88a–b allows an operator of the machine 50 to distinguish between acceptable seals and defective seals. This will prevent the mistaken destruction of packages that had acceptable seals, only to be incorrectly designated defective seals since it was difficult to distinguish between acceptable and defective seals.

If the thermoplastic layers 87a–b and 88a–b are composed of a polyethylene material, then colour coating the layers is easily accomplished by adding an approved food dye to the polyethylene resins to create a coloured coating.

FIGS. 9 and 10 illustrate the critical junction 70 where the longitudinal strip 120 crosses the transversal seal 24. The longitudinal strip 120 may be regarded as an additional coating layer. In FIG. 9, a rupture occurs which is indicative of a good seal. In FIG. 10, the sealing is defective since there was no rupture when the seal was pulled apart.

FIGS. 11–15 illustrate the longitudinal seal between the longitudinal strip 120 and the package 20. The longitudinal strip 120 is sealed to the second thermoplastic layer 87 at the longitudinal sealer 56 on the packaging machine 50. In FIG. 11, the seal 22 is acceptable since a rupture occurs when the strip 120 is pulled apart from the package 20. The second thermoplastic layer 87 remains with the longitudinal strip 120 when the strip is pulled apart from the package 20. A fourth thermoplastic layer 91 is disposed on the opposite side of the paperboard layer 84.

Similarly in FIG. 12, the seal 22 is acceptable since a rupture occurs where the second and third thermoplastic layers 87 and 88 remain with the longitudinal strip 120 thereby exposing the barrier layer 86. If the barrier layer 86 is composed of aluminum, then the shiny layer 86 will be visible upon pulling apart of the longitudinal strip 120.

FIG. 13 shows a complete rupture of the package 20, down to the paperboard layer 84 where the all thermoplastic layers 85, 87 and 88, the barrier layer 86 and a portion of the paperboard layer remain with the longitudinal strip 120 when the strip is pulled apart from the package 20.

FIG. 14 shows a delamination of the longitudinal strip 120 that is indicative of a good seal. The longitudinal strip 120 is actually composed of three layers 121, 122 and 123. The first layer 121 of the longitudinal strip 120 remains on the package 20 while the other two layers 122 and 123 are pulled apart.

FIG. 15 shows a defective seal where the entire longitudinal strip 120 is pulled apart from the package 20 without any rupturing or delamination. It is apparent to those skilled in the art that one may mistake a good seal where delamination occurs for a defective seal as shown in FIG. 15.

A second aspect of the present invention is a coloured coated longitudinal strip 120 to allow one to distinguish between a delamination as shown in FIG. 14 and a defective seal as shown in FIG. 15. A preferred embodiment of this second aspect of the invention is to have layer 121 coloured blue and layer 122 coloured yellow to make green when one layer is placed over the other layer. Thus, if a delamination occurs, the longitudinal strip 120 will change from green to blue and yellow allowing one to easily determine that a delamination has occurred, and not a defective seal, thus, preventing the unnecessary destruction of packages.

An alternative to this aspect of the present invention would have different coloured layers 121, 122 and 123, however, without any colour transformation due to overlying layers. For example, layer 121 may be blue, layer 122 red and layer 123 green. Thus, if a delamination occurs, one will be able to determine such delamination from the appearance of the different colours of the layers.

If a defective seal does occur, as shown in FIG. 15, one will not see a coloured layer, either 121 or 122 remaining on the package 20. Instead, one will only see the longitudinal strip 120 as a single colour, green, if the preferred embodiment is utilized. Alternatively, if all three layers have different colours, than when pulled apart, one side of the longitudinal strip 120 will have one colour, maybe blue, and the other side will have a different colour, maybe green.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

We claim as our invention:

1. A method of verifying the seals of a package fabricated on a form, fill and seal packaging machine, the method comprising:

providing a web of a multilayered packaging material, the multilayered packaging material having an exterior surface and an interior surface, the interior surface colored to allow for verification of a seal;

fabricating a parallelepiped package from the material on the packaging machine, the package having a longitudinal seal and a transversal seal, the transversal seal sealing two sides of the interior surface to one another; and verifying the transversal seal by opening the transversal seal of at least one package;

whereby the transversal seal is defective if both colored sides of the seal are visible when the transversal seal is opened for verification.

2. The method according to claim 1 wherein the multilayered packaging material comprises a coloured interior thermoplastic layer, a barrier layer, a paperboard layer and an exterior thermoplastic layer.

3. The method according to claim 2 wherein the multilayered packaging material further comprises an additional thermoplastic layer disposed between the coloured interior thermoplastic layer and the barrier layer.

4. The method according to claim 1 wherein the package further comprises a multilayered longitudinal strip disposed about the longitudinal seal, the multilayered strip having at least two layers, each layer of a different colour.

5. The method according to claim 4 wherein the one of the two layers of the longitudinal strip is blue and the other is yellow to provide a green coloured longitudinal strip when the two layers are overlapping.

* * * * *